United States Patent
Nakagawa et al.

(10) Patent No.: US 11,376,771 B2
(45) Date of Patent: Jul. 5, 2022

(54) METHOD OF MANUFACTURING IN-MOLD DECORATIVE MOLDED PRODUCT

(71) Applicant: Panasonic Intellectual Property Management Co., Ltd., Osaka (JP)

(72) Inventors: Takashi Nakagawa, Osaka (JP); Takayuki Nagahara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 291 days.

(21) Appl. No.: 16/665,576

(22) Filed: Oct. 28, 2019

(65) Prior Publication Data

US 2020/0147845 A1    May 14, 2020

(30) Foreign Application Priority Data

Nov. 8, 2018    (JP) .............................. JP2018-210417

(51) Int. Cl.
    *B29C 45/16*    (2006.01)
    *B29C 45/04*    (2006.01)
    (Continued)

(52) U.S. Cl.
    CPC .......... *B29C 45/1671* (2013.01); *B29C 45/04* (2013.01); *B29C 45/1635* (2013.01);
    (Continued)

(58) Field of Classification Search
    CPC ...... B29C 2037/0046; B29C 45/14016; B29C 45/14827; B29K 2995/0098
    See application file for complete search history.

(56) References Cited

U.S. PATENT DOCUMENTS

2014/0197570 A1*  7/2014  Hiraishi ............ B29C 45/14016
                                                            264/259
2015/0290852 A1  10/2015  Nakagawa et al.
(Continued)

FOREIGN PATENT DOCUMENTS

JP       60009720 A   *  1/1985   ....... B29C 45/14016
JP       2-121997        10/1990
(Continued)

OTHER PUBLICATIONS

Notice of Reasons for Refusal dated Mar. 29, 2022 in Japanese Patent Application No. 2018-210417, with Machine Translation.

*Primary Examiner* — Kelly M Gambetta
*Assistant Examiner* — Virak Nguon
(74) *Attorney, Agent, or Firm* — Wenderoth, Lind & Ponack, L.L.P.

(57) ABSTRACT

A method relates to manufacturing an in-mold decorative molded product including a transfer layer formed on a surface of an injection-molded product. The method includes inserting, in a first mold for injection molding, an in-mold transfer film including the transfer layer disposed on a base film; forming a molding injection space by mold clamping of the first mold and a second mold including a structure for injecting a molding resin into the molding injection space and a structure for holding the in-mold decorative molded product; and forming the in-mold decorative molded product by filling the molding injection space with the molding resin and then opening the first and second molds. When the base film is separated from the in-mold decorative molded product by opening the first and second molds, a peeling weight varies depending on a portion in an end part of the in-mold decorative molded product.

5 Claims, 9 Drawing Sheets

(51) Int. Cl.
*B29C 45/64* (2006.01)
*B29C 45/27* (2006.01)
(52) U.S. Cl.
CPC ...... *B29C 45/1675* (2013.01); *B29C 45/2735* (2013.01); *B29C 45/64* (2013.01)

(56) References Cited

U.S. PATENT DOCUMENTS

2016/0046052 A1* 2/2016 Ito .......................... B32B 37/02
428/354
2017/0210084 A1* 7/2017 Kaneuchi .............. B32B 37/025

FOREIGN PATENT DOCUMENTS

| | | |
|---|---|---|
| JP | 2005-103996 | 4/2005 |
| JP | 2016-203516 | 12/2016 |
| WO | 2014/083732 | 6/2014 |

* cited by examiner

METHOD OF MANUFACTURING IN-MOLD DECORATIVE MOLDED PRODUCT

CROSS-REFERENCE TO RELATED APPLICATIONS

This application claims priority of Japanese Patent Application No. 2018-210417 filed on Nov. 8, 2018, the contents of which is incorporated herein by reference.

BACKGROUND

1. Technical Field

The present disclosure relates to a method of manufacturing an in-mold decorative molded product applied to an external decorative molded product used for home electric appliances and automobile interior components.

2. Related Art

One of conventional surface decoration methods for resin molded products is a film in-mold method in which a transfer layer having a function and a design of a hard coat applied and printed onto a film is transferred to a surface of a molded product at the same time as injection molding (see, e.g., Japanese Patent Publication No. 2005-103996). FIG. 2 is a cross-sectional view of an injection mold for molding a conventional in-mold decorative molded product described in Japanese Patent Publication No. 2005-103996.

In FIG. 2, an in-mold transfer film 2 is inserted between an A mold 5 that is a fixed mold of the injection mold and a B mold 6 that is a movable mold, and the A mold and the B mold are mold clamped, and a molding resin 7 is injected from an injection gate 8 into a molding space part 12 after mold clamping. This brings a transfer surface of the in-mold transfer film 2 and the molding resin into close contact with each other. The molding resin is filled into the molding space part 12, and a transfer layer of the in-mold transfer film 2 is brought into close contact with a surface of a molded product. At the time of mold opening, the in-mold transfer film is peeled off at an interface between a release layer formed on a base film and the transfer layer, and an ejector pins 4 is projected for ejection, then, the molded product having only the transfer layer transferred to the surface of the molded product is ejected.

In FIG. 4, the in-mold transfer film has a release layer 42, a hard coat layer 43, and an anchor layer 44 formed on a base film 41, and these layers are referred to as an in-mold original fabric 48. An ink layer 45 serving as a printed pattern and a binder layer 46 for ensuring adhesion with the molding resin are formed on the in-mold original fabric 48 to manufacture the in-mold transfer film 2. If a decorative pattern exists, the ink layer of the printed pattern is formed; on the contrary, if only the function of the hard coat layer is transferred, only the binder layer may be formed without formation of the ink layer.

A PET film made of a polyester resin is often used as the base film 41, and the release layer 42 is applied, dried, and formed on the entire surface of the PET film by gravure coating. The hard coat layer 43 imparting a hard coat function is similarly applied, dried, and formed on the entire surface of the release layer 42 by gravure coating. The anchor layer 44, the ink layer 45, and the binder layer 46 are further formed in multiple layers. Although the film is configured in a peelable manner at the interface between the release layer 42 and the hard coat layer 43, an excessively weak peeling force causes the base film 41 and the transfer layer 47 to float in the state of the in-mold transfer film 2. On the other hand, an excessively strong peeling force causes a trouble that the transfer layer 47 does not remain on an external surface since the transfer layer 47 is not peeled off at the time of molding or causes sticking of a molded product or dropping of a molded product if the mold is opened while the molded product still remains on the in-mold transfer film 2. Therefore, the peeling force is set within a certain range of strength.

In the case of a molded product shape resulting in a flat parting shape of an outer circumferential part of a molded product, a film is disposed flat in an end part of the molded product. Then, an angle of a force of peeling in the mold opening direction is 0 degrees relative to a force of restraining the film with respect to initial occurrence of a peeling starting point, so that peeling is started from a state not having a force of peeling the transfer layer of the in-mold transfer film. Therefore, a total value of stress generated in the in-mold transfer film pulling the molded product becomes extremely high until a force generated in the mold opening direction increases.

It is necessary to increase a molded product holding force, but, in the case of a display cover lens with no protrusions such as boss ribs disposed on a back surface, it is difficult to increase the molded product holding force. Additionally, even if the holding force is increased, a strong stress pulling the molded product causes a problem such as deformation of a holding portion of the molded product.

SUMMARY

One non-limiting and exemplary embodiment provides a method of manufacturing an in-mold decorative molded product capable of reducing a holding force required for holding a molded product when a transfer layer is peeled from an in-mold transfer film.

In one general aspect, the techniques disclosed here feature: a method of manufacturing an in-mold decorative molded product according to a first aspect is a method of manufacturing an in-mold decorative molded product including a transfer layer formed on a surface of an injection-molded product, the method including:

inserting in a first mold for injection molding an in-mold transfer film including the transfer layer disposed on a base film;

forming a molding injection space by mold clamping of the first mold and a second mold including a structure for injecting a resin into the molding injection space and a structure for holding a molded product; and forming a molded product by filling the molding injection space with a molding resin and then opening the second mold and the first mold, wherein when the base film of the in-mold transfer film is separated from the in-mold decorative molded product integrated with the transfer layer by opening the molds, a peeling weight varies depending on a portion in an end part of the in-mold decorative molded product so that a peeling starting point is generated from a position with a light peeling weight in the in-mold transfer film to peel the in-mold decorative molded product from the in-mold transfer film.

As described above, in the in-mold decorative molding method according to the present disclosure, the peeling stress generated in the molded product is reduced to decrease the holding force required for holding the molded product so as to generate a peeling starting point when the transfer layer is peeled from the in-mold transfer film. This enables provision of a molded of manufacturing an in-mold decorative product using a molded product shape for easily starting the peeling as well as an in-mold mold for forming the shape and an in-mold transfer film.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

Figure 1:
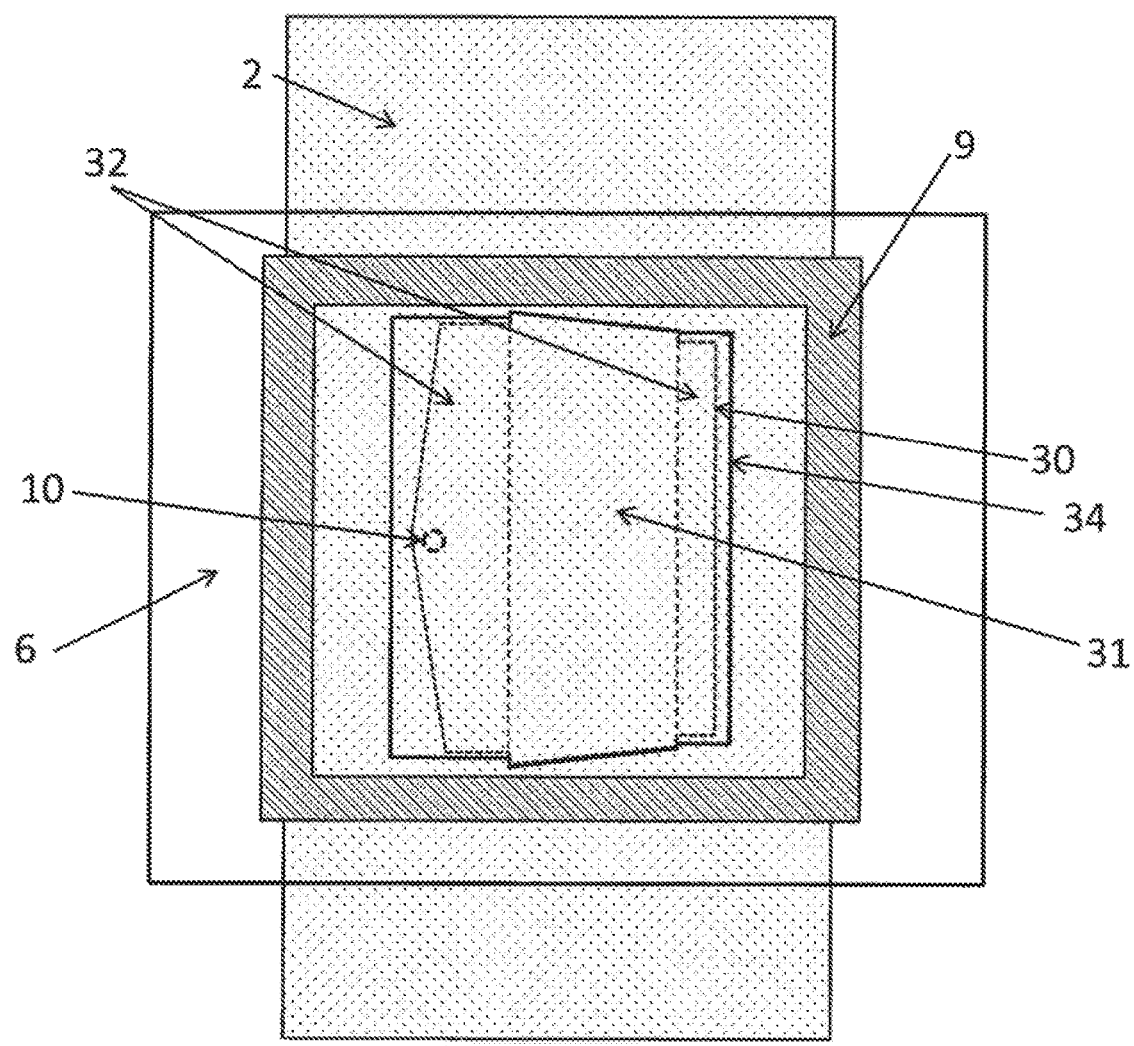
FIG. 1 is a view showing a shape of an in-mold mold for molding an in-mold decorative molded product according to a first embodiment.

A method of manufacturing an in-mold decorative molded product according to a first aspect is a method of manufacturing an in-mold decorative molded product including a transfer layer formed on a surface of an injection-molded product, the method including:

inserting in a first mold for injection molding an in-mold transfer film including the transfer layer disposed on a base film;

forming a molding injection space by mold clamping of the first mold and a second mold including a structure for injecting a resin into the molding injection space and a structure for holding a molded product; and forming a molded product by filling the molding injection space with a molding resin and then opening the second mold and the first mold, wherein when the base film of the in-mold transfer film is separated from the in-mold decorative molded product integrated with the transfer layer by opening the molds, a peeling weight varies depending on a portion in an end part of the in-mold decorative molded product so that a peeling starting point is generated from a position with a light peeling weight in the in-mold transfer film to peel the in-mold decorative molded product from the in-mold transfer film.

With this configuration, in an in-mold decorative molding method, the peeling starting point is easily generated when the transfer layer is peeled from the in-mold transfer film, so that a peeling stress generated in the molded product can be reduced to decrease a holding force required for holding the molded product.

In the method of manufacturing an in-mold decorative molded product according to a second aspect, the peeling weight of the in-mold transfer film may vary depending on a portion of the in-mold decorative molded product, in the first aspect.

In the method of manufacturing an in-mold decorative molded product according to a third aspect, the in-mold decorative molded product may include a portion in which the in-mold transfer film in the end part forms an angle of 0 degrees relative to a parting plane depending on a portion of the in-mold decorative molded product, and may include a shape in which the angle varies by a taper shape or an R shape depending on the portion, in the second aspect.

With this configuration, the peeling angle in the end part of the in-mold decorative molded product can vary, and the peeling weight can vary.

In the method of manufacturing an in-mold decorative molded product according to a fourth aspect, the peeling weight of the in-mold transfer film may vary depending on a portion in a surface direction, in the first aspect.

With this configuration, the peeling weight can vary in the surface direction.

In the method of manufacturing an in-mold decorative molded product according to a fifth aspect, the peeling weight of the in-mold transfer film may vary in a width direction perpendicular to a conveying direction of the in-mold transfer film, in the first aspect.

In the method of manufacturing an in-mold decorative molded product according to a sixth aspect, the in-mold transfer film may further include a binder layer disposed on the transfer layer, in the third aspect.

In the method of manufacturing an in-mold decorative molded product according to a seventh aspect, wherein the presence/absence of application of the binder layer may be changed in the width direction so that the peeling weight of the in-mold transfer film varies in a width direction perpendicular to a conveying direction of the in-mold transfer film, wherein the binder layer may be applied to a portion located in a product part of the in-mold decorative molded product, and the binder layer may not be applied to a portion located in a cutting portion of the in-mold decorative molded product, in the sixth aspect.

In the method of manufacturing an in-mold decorative molded product according to an eighth aspect, a variation range of the peeling weight of the in-mold decorative molded product may be σ0.1 N/mm or more and 0.5 N/mm or less, in the third aspect.

With this configuration, the peeling weight may vary in a plane by changing the shape conditions and material of the release layer. As a result, the generation location of the peeling starting point due to fluctuations in the peeling weight can be dispersed.

An apparatus for producing an in-mold decorative molded product according to a ninth aspect is a molding apparatus for an in-mold decorative molded product, comprising:

a first mold for injection molding allowing insertion of an in-mold transfer film including a transfer layer disposed on a base film;

a second mold including a structure for injecting a resin into a molding injection space and a structure for holding a molded product, the molding injection space being formed by mold clamping with the first mold and the second mold; and a molding resin injection part forming an injection-molded product by filling the molding injection space with a molding resin, while forming the transfer layer on a surface of the injection-molded product, wherein the molding apparatus includes a potion in which an angle of 0 degrees is formed by a parting plane and a portion of the in-mold transfer film in an end part of the in-mold decorative molded product including the transfer layer formed on the surface of the injection-molded product made of the molding resin at the time of mold opening of the first mold and the second mold, wherein the molding apparatus sets an angle formed by the parting plane and a portion of the in-mold transfer film in the end part of the in-mold decorative molded product to a predetermined angle in accordance with a taper shape or an R shape in a region of the portion of the in-mold transfer film forming the angle of 0 degrees relative to the parting plane, and wherein peeling weight of the in-mold transfer film varies depending on the portion of the in-mold transfer film in the end part of the in-mold decorative molded product.

<Background of Embodiment According to the Present Disclosure>

As described above, there is a problem that it is difficult to increase the molded product holding force, and even if the holding force is increased, a strong stress pulling the molded product causes a problem such as deformation of a holding portion of the molded product. Then, the present inventor conducted studies to reduce a peeling stress generated in the molded product so as to reduce a holding force required for holding the molded product. Consequently, the present inventor conceived that it is necessary to generate a peeling starting point to reduce the peeling stress and that it is necessary to set a peeling characteristic and a peeling shape for easily generating the peeling starting point.

Figure 5:
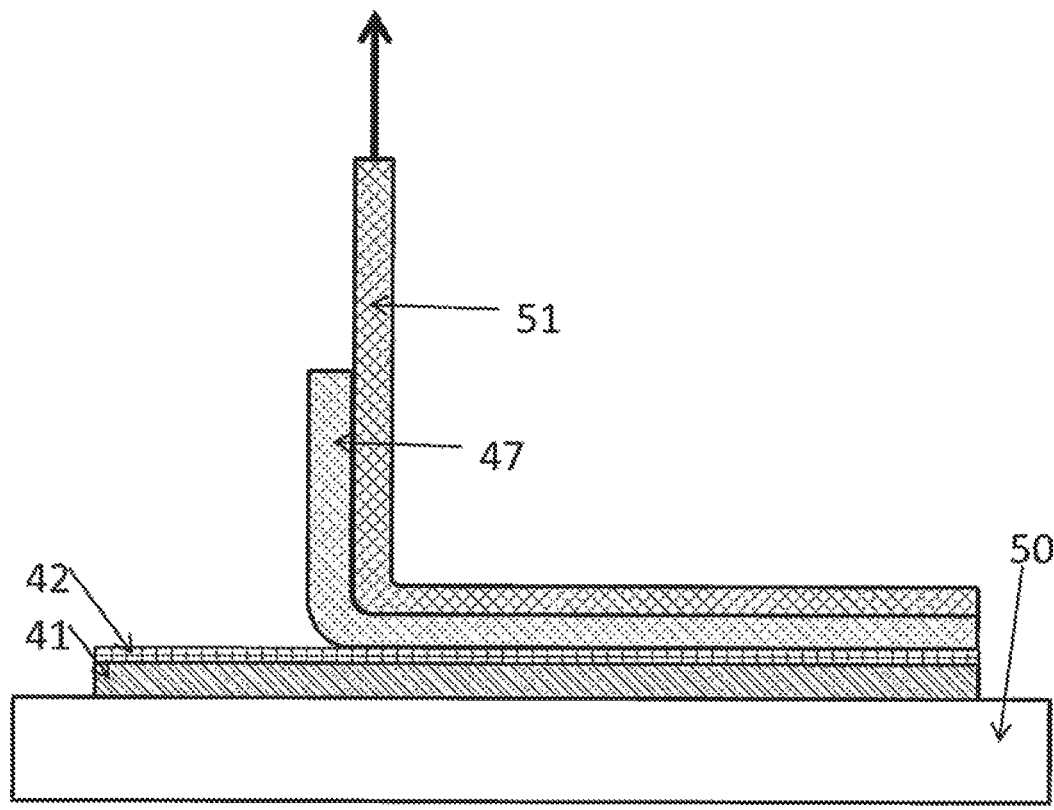
FIG. 5 is a schematic cross-sectional view of a method of evaluating a peeling weight by tape peeling evaluation.

For measurement management of the peeling force in the film in-mold method, as shown in FIG. 5, a tape is brought into close contact with the transfer layer and a force required for peeling the transfer layer is evaluated in terms of a tensile force of the tape. Although the management is generally performed with a peeling weight after the peeling starts, this is not an evaluation of a peeling starting point at which the peeling starts. The peeling starting point is generated in advance by cutting, and the peeling force is evaluated from a floating state of the transfer layer. This is referred to as a tape peeling evaluation.

In the film in-mold method, the release layer and the hard coat layer are formed on the entire surface and are therefore continuous even on the outside of the parting line of the molded product. Thus, it is required to destroy the adhering state between the release layer and the hard coat layer and to cut the hard coat layer for generating the peeling starting point in the end part of the molded product.

Figure 6:
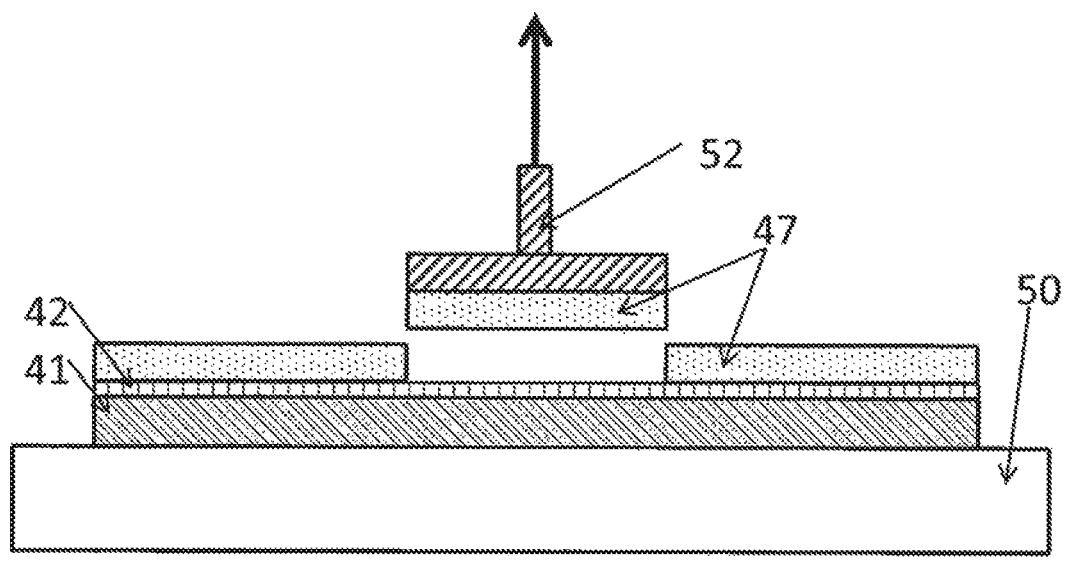
FIG. 6 is a schematic cross-sectional view of a method of evaluating a generation force of a peeling starting point by surface peeling evaluation.

In the case of evaluating the peeling force for peeling the hard coat layer from the state without a peeling starting point, the evaluation can be made with a peak stress at which fracture begins when a resin chip is bonded to the transfer layer of the in-mold transfer film as shown in FIG. 6 and pulled by a tensile tester. This is referred to as a surface peeling evaluation.

In generation strength evaluation of the peeling starting point, while the strength is managed at a numerical value such as 0.01 N/mm to 0.1 N/mm in the conventional tape peeling evaluation, it was found that a force of the peeling starting point exceeding 0.5 N/mm is generated in the surface peeling evaluation.

Figure 7:
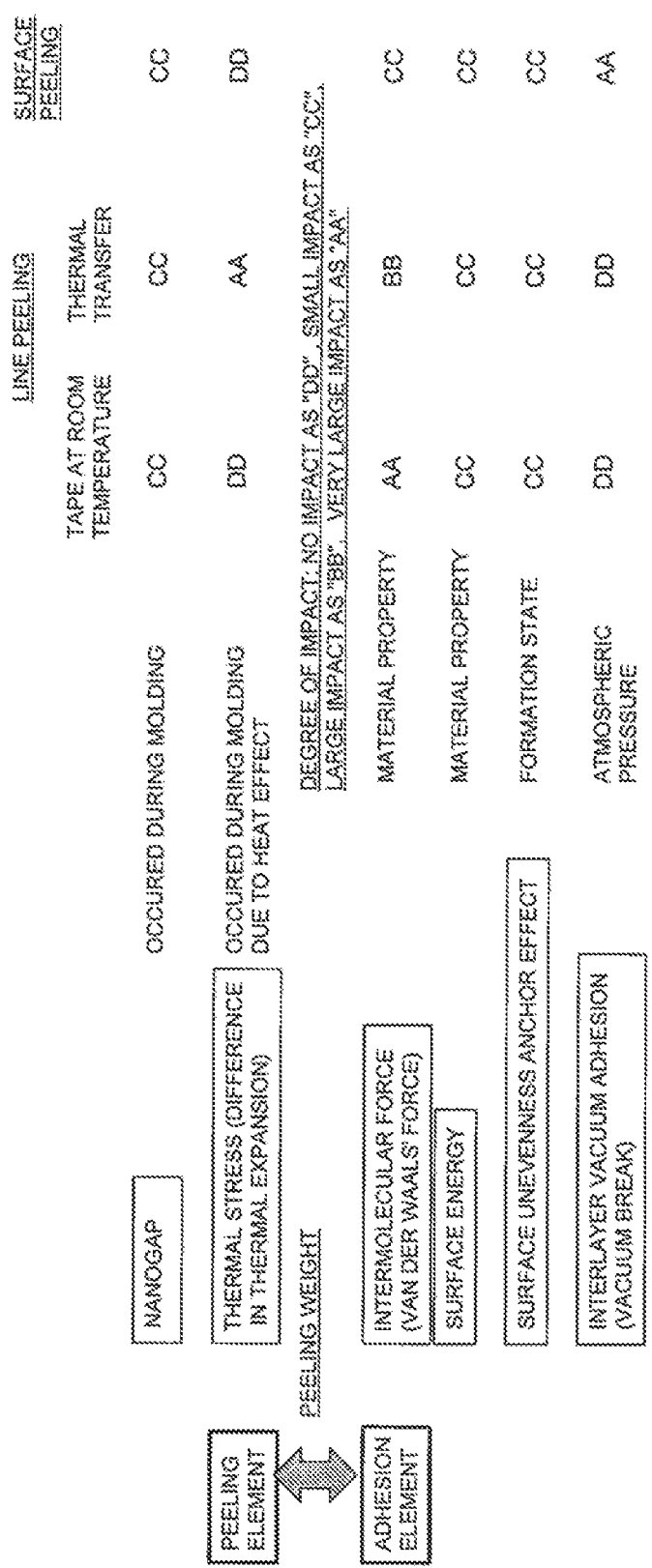
FIG. 7 is a view showing elements generating a peeling force and an adhesion force.

As shown in FIG. 7, a peeling force and an adhesion force are generated in a relationship between a peeling element and an adhesion element, and a symbol "AA", a symbol "BB", a symbol "CC", and a symbol "DD" denote elements having a very large impact, a large impact, a small impact, and no impact, respectively, on various peeling force evaluation methods. The peeling element is affected by a thermal stress due to a difference in thermal expansion of a nanogap, which is present at the interface between the release layer and the hard coat layer, and the materials constituting the in-mold transfer film. On the other hand, the adhesion element is affected by an intermolecular force (van der Waals' force), a surface energy, a surface unevenness anchor effect, and an interlayer vacuum adhesion force in the materials of the release layer and the hard coat layer.

The conventional tape peeling evaluation is made in terms of the peeling weight after the start of peeling and is determined by a difference between the peeling element and the adhesion element. If the thermal stress is generated in the in-mold transfer film, the influence of the peeling element is increased, and if the thermal stress is not generated, i.e., if the in-mold transfer film is not thermally affected, the adhesion element is purely evaluated. In the conventional tape peeling evaluation, the peeling is already started, and therefore, the interface is not subjected to such a force generated in the case of vacuum break. On the other hand, if it is attempted to peel the release layer from the hard coat layer in an unpeeled state, this is an evaluation of the adhesion strength before the start of peeling, which increases the influence of interlayer vacuum adhesion (vacuum break) that cannot be evaluated by the conventional tape peeling evaluation.

Then, it was found that the adhesion force before the start of peeling affects the total force of the force generating the interlayer vacuum break and the peeling force evaluated by the normal tape peeling in terms of the start of floating of the release layer and the hard coat layer from the adhesion state. Even if the peeling force evaluated by the normal tape peeling is set smaller through material design or coating condition design, the peeling force is dominated by the atmospheric pressure in a normal manufacturing environment. Therefore, it was confirmed that the force generated at the peeling starting point is larger by one or more orders of magnitude than the peeling force evaluated by the normal tape peeling.

Particularly, it was found that the peeling weight in the surface peeling evaluation is high when the peeling weight of the in-mold transfer film is uniformly distributed regardless of location, while the peeling weight in the surface peeling evaluation is reduced when the peeling weight is nonuniform and has large variations. It was also found that the peeling weight in the surface peeling evaluation is also reduced by varying the peeling angle to locally concentrate the tensile stress in the surface peeling evaluation.

To always fix the molded product to the fixed mold, it is necessary to hold the molded product with a force higher than the high peeling force generated in the surface peeling evaluation rather than the peeling force of the conventional tape peeling.

A normal molded product is provided with a boss rib, so that the molded product is held by the fixed mold with a high force. Then, if the product is held with a force greater than the peeling force generated in the surface peeling evaluation as described above, and the boss rib shape is not deformed by the tension caused by the peeling force, problems hardly occur. However, in the case of a molded product having no boss rib on a back surface, it is necessary to form a structure in which the molded product is held with an ejector pin biting therein. In this case, to set the holding force greater than the peeling force generated in the surface peeling evaluation as described above, amounts of biting and undercutting of the ejector pin must be increased, so that a very strong force is required for removing the molded product from the ejector pin. This increases a force required for taking out the product by a take-out robot of a molding machine, resulting in insufficient rigidity of the take-out robot and a trouble such as deformation of the molded product at the time of taking out. For example, if a design is made to increase the amount of biting of the ejector pin, a high stress at the peeling starting point brings a biting part into a deformed or turned-up state, leading to a defect of the molded product. Additionally, if a shape cannot be formed on the back surface of the molded product, it is necessary to set a cutting part to be cut and removed in an outer circumference so as to set a structure for holding the molded product in the fixed mold in the cutting part. This increases the unnecessary cutting part, resulting in an increase in cutting cost in post-process. If the cutting part is small, a large number of holding pins cannot be arranged, so that the holding force of the molded product becomes insufficient, resulting in problems such as sticking of the molded product or dropping of the molded product.

On the other hand, the peeling force generated in the surface peeling evaluation is the total value of the force generated in an outer circumferential end part of a surface and shifts to a smaller peeling force generated in the tape peeling evaluation after the peeling starting point is generated, and then, if the peeling starting point can locally be generated, the peeling force generated in the surface peeling evaluation becomes lower. The same applies to the molded product that is the product, and the holding force necessary for holding the molded product can be reduced by dispersing a portion in which the peeling starting point is generated.

Consequently, the present inventor conceived the present disclosure in which the holding force required for holding the molded product is reduced by decreasing peeling stress generated in the molded product so as to generate the peeling starting point when the transfer layer is peeled from the in-mold transfer film in the in-mold decorative molding method. The method of manufacturing an in-mold decorative molded product according to the present disclosure can provide a method for manufacturing an in-mold decorative molded product capable of facilitating the start of peeling.

The in-mold decorative molded product according to embodiments will be described with reference to the drawings. In the drawings, substantially the same members are denoted by the same reference numerals.

First Embodiment

Figure 2:
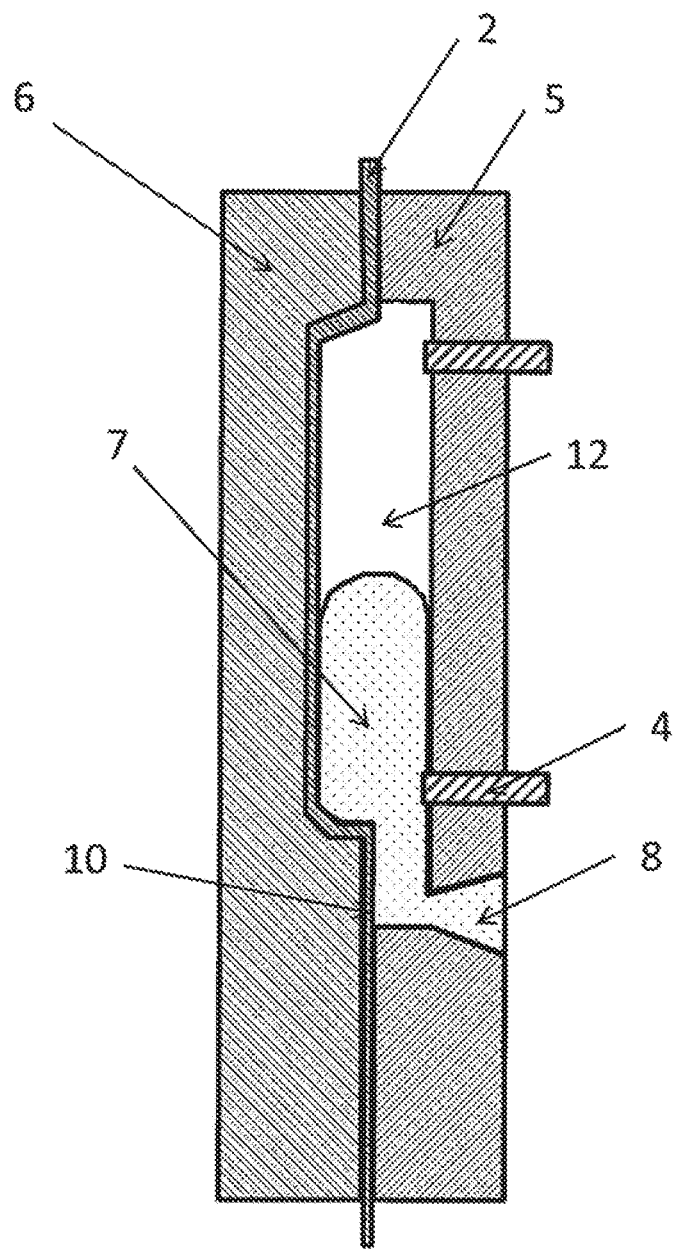
FIG. 2 is a cross-sectional view showing a mold cross-sectional structure showing a state of an in-mold transfer film and an injection resin in a conventional in-mold decorative molding method described in Japanese Patent Publication No. 2005-103996.

FIG. 1 is a view showing an in-mold mold for molding an in-mold decorative molded product according to a first embodiment. A cross-sectional structure of the mold is almost the same as a view showing a mold cross-sectional structure showing a state of an in-mold transfer film and an injection resin in a conventional in-mold decoration method and therefore will be described with reference to a cross-sectional view of FIG. 2.

The in-mold mold is disposed to face a molding machine and is made up of an A mold 5 that is a fixed mold and a B mold 6 that is a movable mold. The A mold corresponds to a first mold, and the B mold corresponds to a second mold in the present disclosure. The B mold 6 is a movable mold and includes, in a molding space part 12, a product molding space part 31 forming a product part and a cutting molding space part 32 to be cut and removed after molding so that an in-mold decorative molded product includes the product part and the cutting part.

Figure 3:
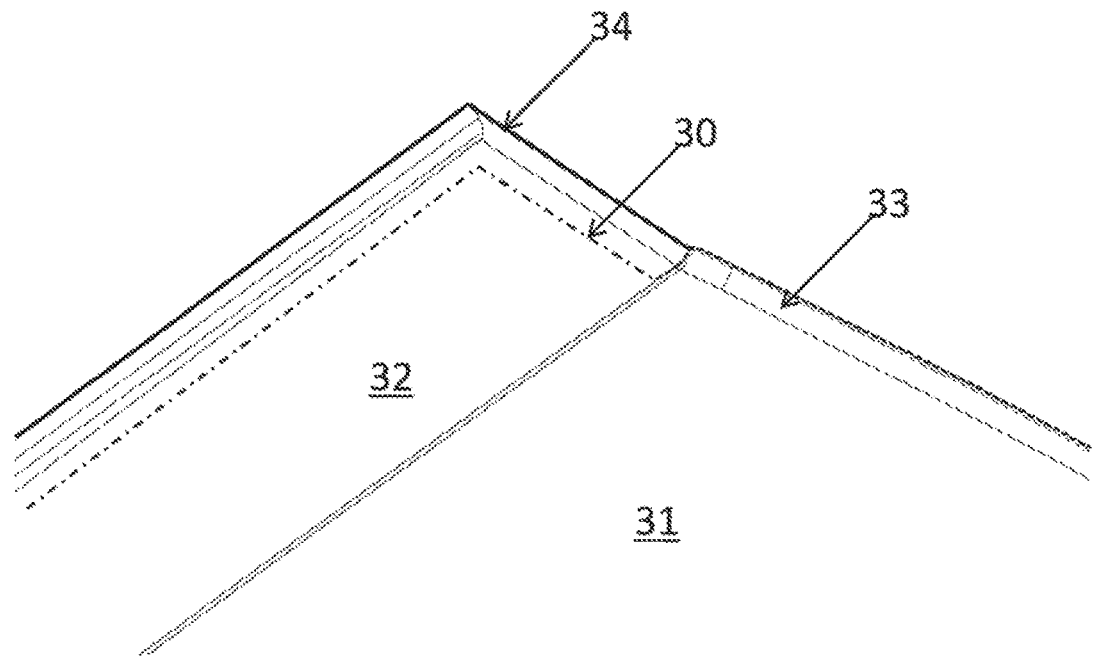
FIG. 3 is a view showing a positional relationship between a portion having a different peeling weight in an in-mold transfer film and the in-mold decorative molded product according to the first embodiment.

End parts of the product molding space part 31 and the cutting molding space part 32 constituting the in-mold decorative molded product form a parting line 30. The parting line is a portion located in the end part of the in-mold decorative molded product, is a butting portion while the A mold 5 serving as the fixed mold and the B mold 6 serving as the movable mold sandwiches an in-mold transfer film, and is a line located at a filling end part of a molding resin. As shown in FIG. 3 showing a three-dimensional shape and a positional relationship of the parting line 30, an R shape 35 is formed in a product molding space side surface portion 33 of the product molding space part 31 not connected to the cutting molding space part 32. The parting line 30 of the cutting molding space part 32 is configured to be flush with a surface of the B mold 6 serving as the movable mold. Therefore, a mold surface step shape 34 is formed on the surface of the B mold 6 outside the parting line 30 of the cutting molding space part 32 so that the end part of the cutting molding space part 32 becomes flat.

With this structure, the parting line 30 of the product molding space part 31 can be formed into the R shape 35 having curved surface, for example, arc curved surface, and the parting line 30 of the cutting molding space part 32 can be formed into a flat shape.

The injection gate 8 is disposed such that the molding resin is injected into the cutting molding space part 32, and the molding resin 7 from the injection gate 8 is injected to an injection gate position 10 of the cutting molding space part 32. A cold runner gate or a hot runner gate is used for the injection gate 8.

In this embodiment, the injection gate is disposed on the left side of the mold surface to achieve a structure in which the molding resin flows from the left to the right, but, it is not limited to the above structure. The injection gate may be disposed in a lower part to achieve a structure in which the molding resin flows from the bottom to the top, and the position of the injection gate is not limited.

The in-mold transfer film 2 is conveyed roll-to-roll to the mold 6 serving as the movable mold by a film feeding device disposed on the upper and lower sides of the molding machine and is inserted into the surface of the mold. The in-mold transfer film 2 is restrained by a clamp 9 provided in the mold 6 and is sucked to the surface of the mold 6 by vacuum suction. Subsequently, the mold 5 and the mold 6 are clamped, and the molding resin 7 is injected from the injection gate 8 provided in the mold 5 and filled into the molding space part 12, so that the molding resin 7 is bonded to the in-mold transfer film 2.

<In-Mold Transfer Film>

Figure 4:
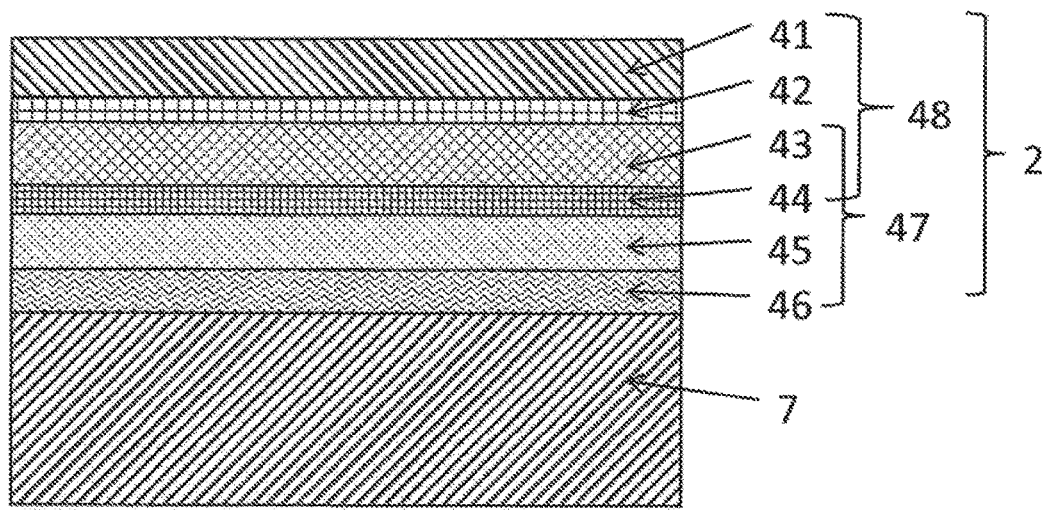
FIG. 4 is a view showing a structure of the in-mold transfer film.

FIG. 4 is a view showing the structure of the in-mold transfer film 2 bonded to the molding resin 7. For the in-mold transfer film 2, an in-mold original fabric 48 is first manufactured by forming a release layer 42 on a base film 41, forming a surface protective layer 43, and forming an anchor layer 44. Although polyethylene terephthalate (PET) is mainly used as a material of the base film, polycarbonate (PC) or oriented polypropylene (OPP) can also be used. While the base film is a layer having a thickness of 10 μm or more and 200 μm or less, a smaller thickness makes the base film easily broken when stretched, and conversely, a larger thickness makes the base film difficult to deform, so that a film of 20 μm or more and 100 μm or less is optimally used.

<Release Layer>

The release layer 42 is a layer made by using a melamine resin or a silicon resin and having a thickness of 0.5 μm or more and 5 μm or less.

<Surface Protective Layer (Hard Coat Layer)>

The surface protective layer 43 is a layer serving as an outermost surface when the in-mold transfer film is transferred to the molding resin. For example, the layer is made by using a high-hardness ultraviolet curable resin etc. and having a thickness of 1 μm or more and 10 μm or less.

<Anchor Layer>

The anchor layer 44 is a layer for enhancing the adhesion between the surface protective layer 43 and a decorative layer 45, and the anchor layer 44 is a layer for imparting more advanced characteristics. For example, the layer is made by using a polyester resin etc. and having a thickness of 1 μm or more and 10 μm or less.

The release layer 42, the surface protective layer 43, and the anchor layer 44 are formed by a coating method such as gravure coating or slit die coating to manufacture the in-mold original fabric 48.

The decorative layer 45 is formed on the in-mold original fabric 48 and forms a printing design corresponding to a surface design of a decorative molded product. The decorative layer 45 is often made up of a plurality of ink layers depending on the surface design. On the contrary, if no printing design is applied to the surface of the decorative molded product, only a binder layer 46 may be formed without formation of the decorative layer. The binder layer 46 is a layer having a function of bonding the molding resin and the in-mold transfer film and is made of an appropriate material selected depending on the type of the molding resin. The decorative layer 45 and the binder layer 46 are formed by using methods of design printing using gravure printing, silk screen printing, offset printing, and inkjet printing.

The decorative layer 45 and the binder layer 46 are formed on the in-mold original fabric 48 to manufacture the in-mold transfer film 2.

The in-mold transfer film 2 is bonded to the molding resin 7 in the mold and is then peeled at a boundary surface between the release layer and the surface protective layer at the time of mold opening, and only the layers from the surface protective layer to the binder layer are transferred as a transfer layer 47 to the surface of the molded resin, so that the decorative molded product is manufactured.

While the release layer needs to have an adhesion force for holding the transfer layer on the base film in the state of the in-mold transfer film 2, the release layer must cleanly be peeled at the time of mold opening after being brought into close contact with the molding resin. Therefore, it is necessary to set the adhesion strength of the release layer to a constant peeling weight so as to avoid an excessive adhesion strength.

<Method of Evaluating Peeling Weight>

FIG. 5 is a schematic cross-sectional view of a method of evaluating a peeling weight by tape peeling evaluation and this is one of evaluation methods for setting and managing the peeling weight. In this tape peeling evaluation, the base film 41 is bonded to a fixed member 50 with a double-sided tape, an adhesive, etc., and a resin tape 51 is affixed to a binder layer surface of the transfer layer 47. Subsequently, the surface of the transfer layer is cut, and the resin tape is then restrained and pulled by a tensile weight measuring instrument etc. to evaluate a peeling weight at the time of peeling of the transfer layer from the release layer. The peeling weight varies depending on a temperature of the in-mold transfer film or depending on a peeling angle and a peeling speed, and therefore, the peeling weight is managed based on evaluation with a value of tensile weight at the time of peeling at constant temperature and speed.

On the other hand, the tape peeling evaluation is an evaluation of the peeling weight following the start of peeling after the surface of the transfer layer is cut. Then, the tape peeling evaluation is not an evaluation of a force for generating a peeling starting point at the start of peeling. Therefore, it is also necessary to evaluate the generation of the peeling starting point by using a method of evaluating the generation force of the peeling starting point with a surface peeling evaluation as shown in FIG. 6.

In FIG. 6, as in FIG. 5, the base film 41 is bonded onto the fixed member 50, and a tensile test chip 52 is bonded to the binder layer surface of the transfer layer 47. Subsequently, the tensile test chip is pulled up by a tensile weight measuring instrument, and the generation force of the peeling starting point of the surface peeling evaluation is evaluated with a peak weight when the transfer layer 47 breaks in an end part of the tensile test chip and the peeling starts. This generation force of the peeling starting point is the force at the occurrence of interlaminar fracture at the interface between the release layer and the surface protective layer, and the generation force occurs in a micro region in the end part of the test chip being pulled, so that the force measured by the tensile tester is a total value of the forces simultaneously generated in the end part of the chip. Therefore, when an end part circumferential length of the tensile test tip is shorter, the force measured by the tensile tester becomes smaller, and when the circumferential length is longer, the measured force becomes larger.

The weight of the peeling starting point evaluated in FIG. 6 is a value larger by one or more orders of magnitude than the tape peeling weight evaluated in FIG. 5. Therefore, after the peeling starting point is generated, the force of peeling the transfer layer becomes very small in the in-mold transfer film. Consequently, the present inventor found that the transfer layer bonded to the molding resin can easily be peeled from the release layer when the force generated at the peeling starting point is dispersed.

Regarding the force of generation of the peeling starting point, if the end part shape of the decorative molded product has a uniform peeling angle, the same peeling weight is generated, and this maximizes a force at which the decorative molded product is pulled by the in-mold transfer film when the peeling starting point is generated. Therefore, a large force of the peeling starting point is generated at the same time in the entire end part of the decorative molded product, and the decorative molded product is likely to be carried by the in-mold transfer film, which easily causes troubles such as film sticking, product dropping, and deformation of holding pins.

Particularly, if the end part of the in-mold decorative molded product is flat and the surface of the mold serving as the movable mold is flat in the parting line of the molding space part, the in-mold transfer film has a flat shape. That is, the in-mold transfer film and the end part of the in-mold decorative molded product form the angle of 0 degrees, or in other words, the angle of the peeling starting point is 0 degrees. Then, the transfer layer of the in-mold decorative film is pulled in a direction substantially perpendicular to the surface of the in-mold transfer film with respect to the direction in which the in-mold decorative molded product is pulled by the mold serving as the fixed mold at the time of mold opening. Therefore, the force becomes zero in such a direction causing a tensile fracture of the transfer layer in a surface direction, so that a very strong force is required for peeling the transfer layer as a plane.

However, if the angle of the end part shape of the in-mold decorative molded product varies depending on a portion as in the in-mold decorative molded product according to the first embodiment, the peeling weight varies depending on a portion, and the force concentrates on a portion of the end part shape where the peeling weight becomes lighter in the decorative molded product, and the generation of the peeling starting point starts from the corresponding portion. Therefore, the large force of the peeling starting point does not occur at the same time on the entire end part of the decorative molded product, and a total force is reduced when the peeling starting point is generated only at a certain portion, so that the decorative molded product is more easily held in the mold serving as the fixed mold. As shown in FIG. 3, the end part of the product part of the decorative molded product has an R shape, and the peeling weight in this portion is lighter as compared to a flat part shape of the end part of the cutting part, so that the portions generating the peeling starting point are dispersed, enabling formation of a state in which the in-mold transfer film is easily peeled from the portion generating the peeling starting point while the peeling spreads with a light peeling weight.

Figure 8:
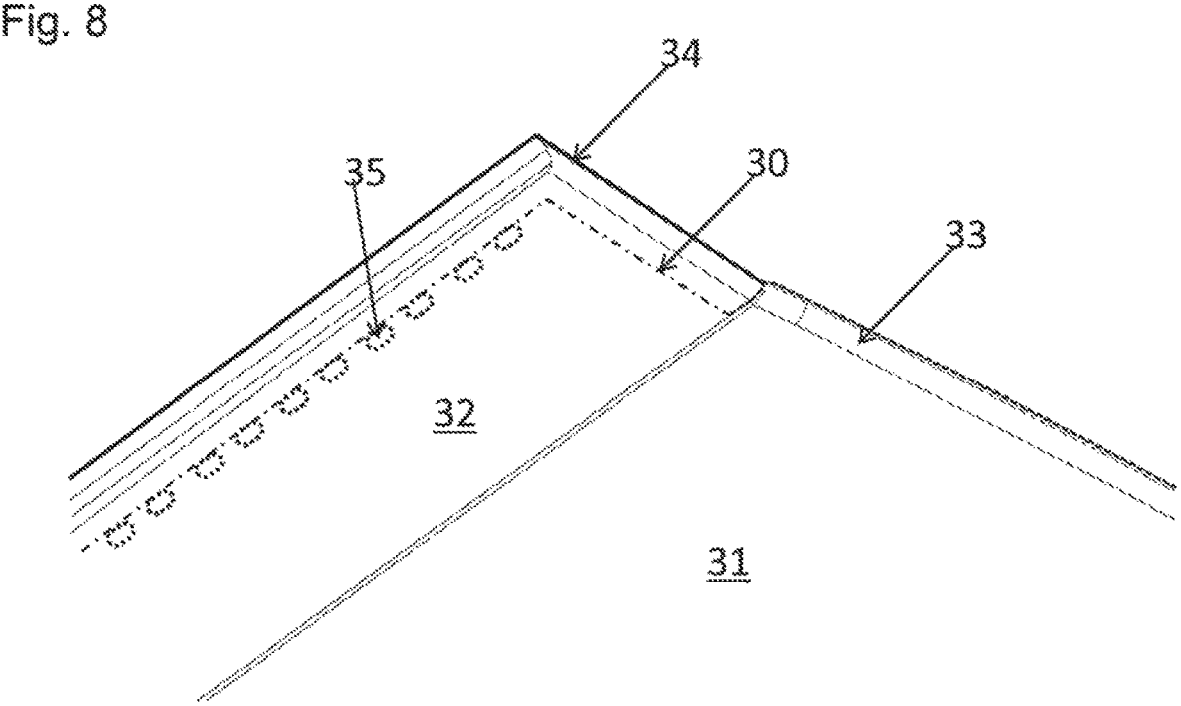
FIG. 8 is a view showing an end part shape of a cutting portion further dispersing the peeling weight of the in-mold transfer film according to the first embodiment.
Figure 9A:
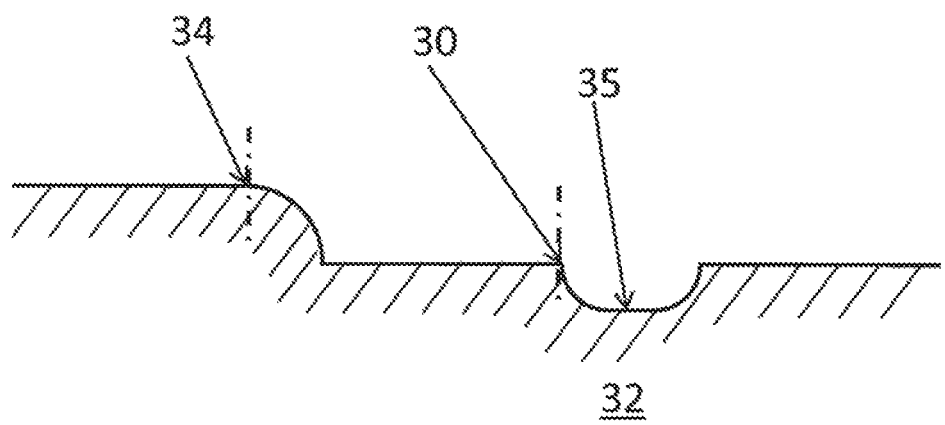
FIG. 9A is a view showing a cross section of an R-shaped portion of the end part shape of the cutting portion further dispersing the peeling weight of the in-mold transfer film according to the first embodiment.
Figure 9B:
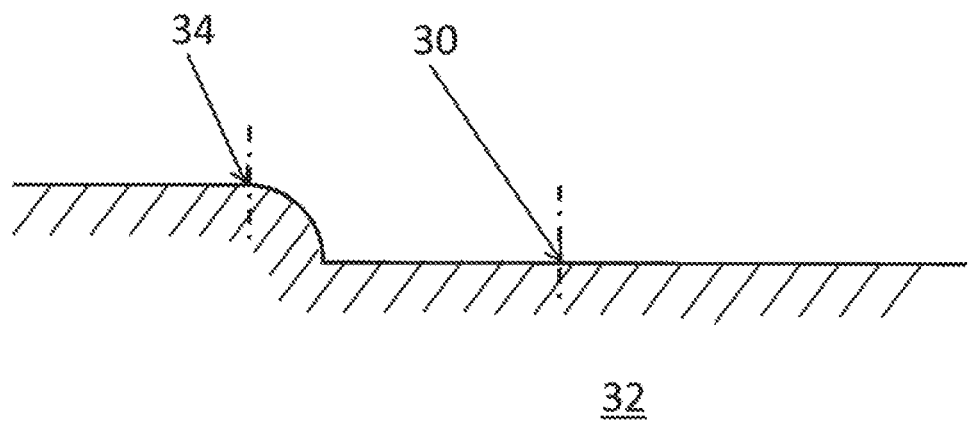
FIG. 9B is a view showing a cross section of a flat part portion of the end part shape of the cutting portion further dispersing the peeling weight of the in-mold transfer film according to the first embodiment.

FIG. 8 is a view showing an end part shape of a cutting portion further dispersing the peeling weight of the in-mold transfer film according to the first embodiment. FIG. 9A is a view showing a cross section of an R-shaped portion of the end part shape of the cutting portion further dispersing the peeling weight of the in-mold transfer film according to the first embodiment. FIG. 9B is a view showing a cross section of a flat part portion of the end part shape of the cutting portion further dispersing the peeling weight of the in-mold transfer film according to the first embodiment.

As shown in FIG. 8, the mold shape is configured to form the shape of the in-mold decorative molded product into the end part shape of the cutting part having the R shape 35 arranged in a distributed manner so that the end part shape is locally convexly formed also in the end part of the cutting part.

FIGS. 9A and 9B show cross-sectional views of the local end part shape. Since the shape of the end part of the cutting part is the R shape arranged in a distributed manner rather than a simple flat shape, and the force for generating the peeling starting point can further be dispersed. The shape locally convexly formed in the in-mold decorative molded product is not limited to the R shape and may be any shape, such as a taper shape, making the angle of the peeling starting point different from that of the flat part.

Second Embodiment

Figure 10:
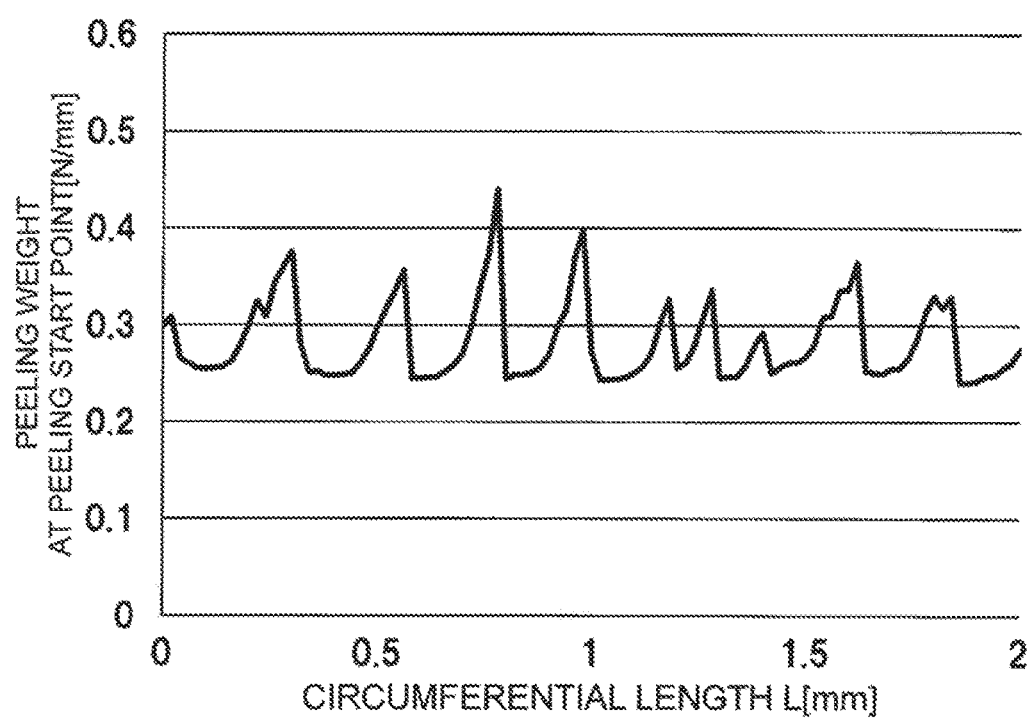
FIG. 10 is a diagram showing a waveform obtained by measuring the peeling weight of the in-mold transfer film according to a second embodiment.

FIG. 10 shows a measurement waveform of a tape peeling weight of an in-mold transfer film according to a second embodiment.

In the second embodiment, as in the first embodiment, an in-mold transfer film having a peeling weight varying depending on a portion is used in a method of manufacturing an in-mold decorative molded product so that the peeling weight of the in-mold transfer film fluctuates in an end part of a decorative molded product where the peeling starting point is generated.

By setting the hardening and drying states of the surface protective layer weaker in a process of forming the surface protective layer on the release layer of the in-mold transfer film, variations occur in the adhering state between the surface protective layer and the release layer, and the formation state of the release layer can be varied such that the peeling weight fluctuates in the plane of the release layer. Additionally, the adhesion force can be fluctuated in the plane in accordance with selection of the material of the release layer and the material of the surface protective layer. When such an in-mold transfer film is measured in tape peeling evaluation, a waveform can be formed such that the peeling weight has characteristics in which the peeling weight repeatedly becomes stronger or weaker in the process of peeling the transfer layer as shown in FIG. 10.

By changing the shape conditions and material of the release layer of the in-mold transfer film, the peeling weight can vary in the plane, and when the variation range of the peeling weight is o0.1 N/mm or more and 0.5 N/mm or less, the generation of the peeling starting point can be dispersed.

When a fluctuation range is within a certain value while the peeling weight is partially fluctuated, a peeling mark or a trouble of peeling can be prevented from occurring due to an unstable peeling state caused by variations in the peeling weight after generation of the peeling starting point according to peeling weight fluctuations. The generation of the peeling starting point is more dispersed when the variation in the peeling weight is greater. If the peeling weight is too large, a state causing a stop of the peeling occurs after the peeling starts. This is because a stripe-shaped mark is generated due to a stop of the peeling and a defective appearance called peeling mark is likely to occur. Therefore, a setting range of the peeling weight may be set within a certain range.

When the in-mold decorative molding is performed by using the in-mold transfer film having such peeling characteristics as in the first embodiment, the tape peeling weight fluctuates in the state of the in-mold transfer film at the end part of the decorative molded product. Therefore, the force generating the peeling starting point generated in the end part becomes inconstant, so that the portion generating the peeling starting point is dispersed, enabling formation of a state in which the in-mold transfer film is easily peeled from the portion generating the peeling starting point while the peeling spreads with a light peeling weight.

Third Embodiment

Figure 11:
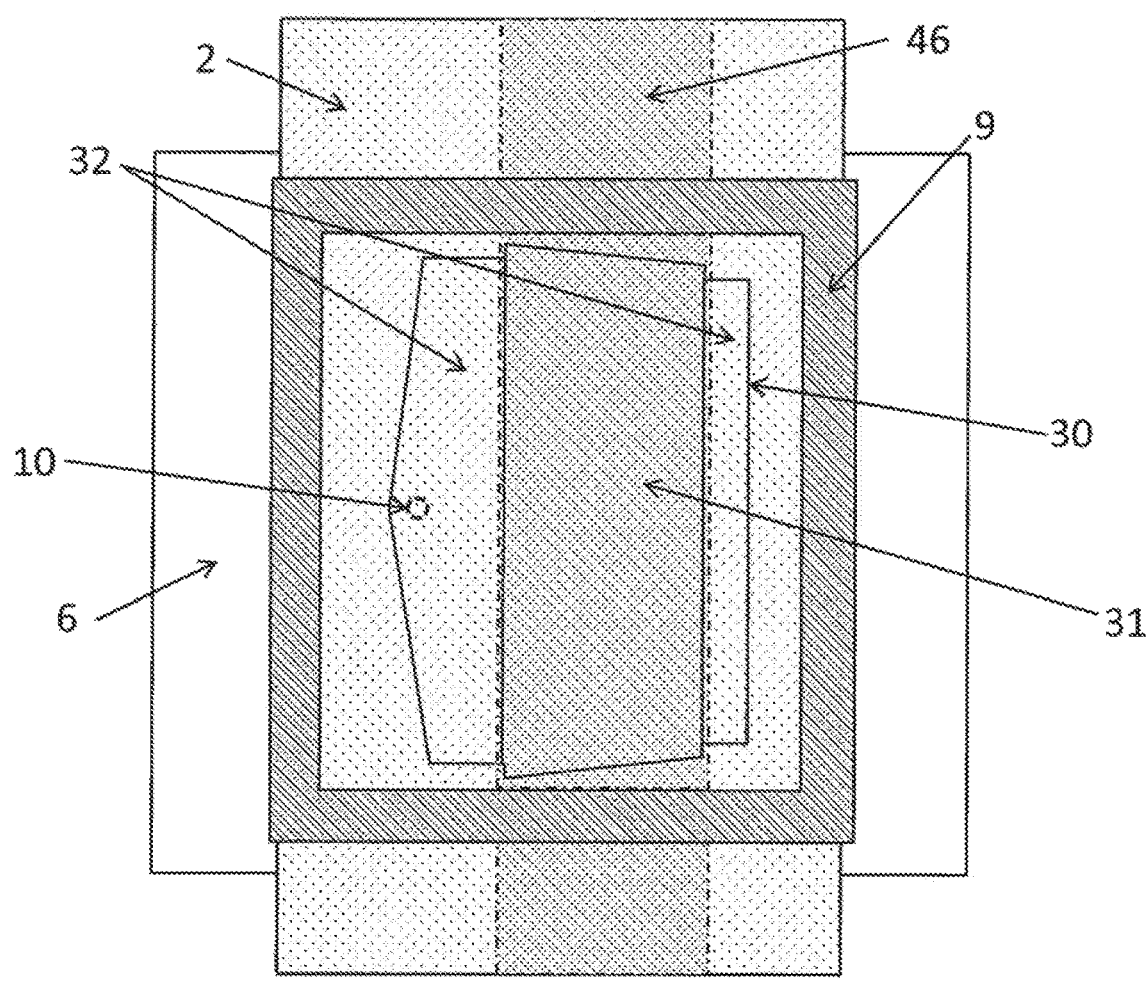
FIG. 11 is a view showing a positional relationship between a shape of an in-mold mold for molding an in-mold decorative molded product and an in-mold transfer film according to a third embodiment.

FIG. 11 is a view showing a positional relationship between a shape of an in-mold mold for molding an in-mold decorative molded product and an in-mold transfer film according to a third embodiment.

In the third embodiment, as in the first embodiment, an in-mold transfer film having a peeling weight varying depending on a portion is used in a method of manufacturing an in-mold decorative molded product so that the peeling weight of the in-mold transfer film fluctuates in an end part of an in-mold decorative molded product where the peeling starting point is generated.

In the in-mold transfer film according to the third embodiment, the binder layer 46 is partially applied in a band shape in a conveying direction of the in-mold transfer film so that the peeling weight varies in a plane. Since the binder layer must be disposed in the product part always required to be bonded to the molding resin, the binder layer is formed to be located in the product molding space part 31 without forming the binder layer in the cutting molding space part 32.

The peeling weight and the force generating the peeling starting point vary depending on a thickness of the transfer layer of the in-mold transfer film, and when the transfer layer is thicker, the peeling weight and the force generating the peeling starting point become larger. Therefore, the generation of the peeling starting point can be dispersed by distributing the thickness of the transfer layer within the plane of an in-mold transfer film.

In the third embodiment, when gravure coating is used, a portion to be applied and a portion not to be applied in a cylinder are formed in a band shape in a coating direction and therefore are arranged as shown in FIG. 11, for example. On the other hand, when pitch printing of a pattern can be performed as in gravure printing or silk screen printing, a pattern shape or position can be arranged such that the binder layer is located only in the product molding space part 31. A method of varying the thickness of the transfer layer may be to vary a thickness of an ink layer in the transfer layer, other than the binder layer.

When the in-mold decorative molding is performed by using the in-mold transfer film having such peeling characteristics as in the first embodiment, the peeling weight and the force generating the peeling starting point are distributed in the plane of the in-mold transfer film in the end part of the decorative molded product. Therefore, the force generating the peeling starting point generated in the end part becomes inconstant, so that the portion generating the peeling starting point is dispersed. This enables formation of a state in which the in-mold transfer film is easily peeled from the portion generating the peeling starting point while the peeling spreads with a light peeling weight.

Specifically, in the cutting molding space part 32 where the binder layer 46 is not disposed, the transfer layer 47 is made up of the surface protective layer 43 and the anchor layer 44. In the product molding space part 31 where the binder layer 46 is disposed, the transfer layer 47 is made up of the surface protective layer 43, the anchor layer 44, and the binder layer 46. Therefore, the thickness of the transfer layer in the parting line of the product molding space part 31 having the binder layer 46 disposed therein becomes larger than the thickness of the transfer layer in the parting line of the cutting molding space part 32 in which the binder layer 46 is not disposed, and the transfer layer is reduced in cuttability, so that the weight generating the peeling starting point is increased.

Therefore, the force required for generating the peeling starting point can be distributed within the plane of the in-mold decorative molded product.

The present disclosure includes appropriately combining any embodiments and/or examples out of the various embodiments and/or examples described above, and the effects of the respective embodiments and/or examples can be produced.

The method of manufacturing an in-mold decorative molded product according to the present disclosure is applicable to uses including exterior decorative molded products for home electric appliances, electrostatic switch input panels of refrigerators, washing machines, rice cookers, etc., and exterior decorative molded products of vehicle interior and exterior for automobiles, especially, cover lens molded products for display parts of car-mounted navigation systems, display audios, heat control panels, and infotainment systems.

DESCRIPTION OF REFERENCE SIGNS 2 in-mold transfer film
4 ejector pin
5 A mold serving as fixed mold corresponding to first mold
6 B mold serving as movable mold corresponding to second mold
7 molding resin
8 injection gate
9 clamp
10 injection gate position
12 molding space part
30 parting lines
31 product molding space part
32 cutting molding space part
33 product molding space side surface portion
34 mold surface step shape
35 local R shape
41 base film
42 release layer
43 surface protective layer (hard coat layer)
44 anchor layer
45 decorative layer (ink layer)
46 binder layer
47 transfer layer
48 in-mold original fabric
50 fixed members
51 resin tape
52 tensile test chip

What is claimed is:

1. A method of manufacturing an in-mold decorative molded product including a transfer layer formed on a surface of an injection-molded product, the method comprising:
   inserting, in a first mold for injection molding, an in-mold transfer film including the transfer layer disposed on a base film;
   forming a molding injection space by mold clamping of the first mold and a second mold including a structure for injecting a molding resin into the molding injection space and a structure for holding the in-mold decorative molded product; and
   forming the in-mold decorative molded product by filling the molding injection space with the molding resin and then opening the second mold and the first mold,
   wherein:
   a peeling weight of the in-mold transfer film varies depending on a portion in an end part of the in-mold decorative molded product;
   when the base film of the in-mold transfer film is separated from the in-mold decorative molded product integrated with the transfer layer by opening the second mold and the first mold, a peeling starting point is generated from an end part in the in-mold transfer film to peel the in-mold decorative molded product from the in-mold transfer film;

the peeling weight of the in-mold transfer film is less at the end part of the in-mold transfer film than at an intermediate part of the in-mold transfer film; and the in-mold decorative molded product includes a section in which the in-mold transfer film in the end part forms an angle of 0 degrees relative to a parting plane depending on the portion in the end part of the in-mold decorative molded product, and includes a shape in which the angle varies by a taper shape or an R shape depending on the portion in the end part of the in-mold decorative molded product.

2. The method according to claim 1, wherein the peeling weight of the in-mold transfer film varies in a width direction perpendicular to a conveying direction of the in-mold transfer film.

3. The method according to claim 1, wherein the in-mold transfer film further includes a binder layer disposed on the transfer layer.

4. The method according to claim 3, wherein:

application of the binder layer is changed in a width direction so that the peeling weight of the in-mold transfer film varies in the width direction perpendicular to a conveying direction of the in-mold transfer film;

the binder layer is applied to a portion located in a product part of the in-mold decorative molded product; and the binder layer is not applied to a portion located in a cutting portion of the in-mold decorative molded product.

5. The method according to claim 1, wherein a variation range of the peeling weight of the in-mold transfer film is ο0.1 N/mm or more and 0.5 N/mm or less.

* * * * *